United States Patent
Berg et al.

(10) Patent No.: US 6,783,390 B2
(45) Date of Patent: Aug. 31, 2004

(54) APPARATUS FOR PREVENTING REVERSE POLARITY CONTACT BETWEEN A STANDARD DRY CELL BATTERY TERMINAL AND A BATTERY COMPARTMENT CONTACT

(75) Inventors: Thomas E Berg, Ft. Collins, CO (US); Gerod Melton, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 9 days.

(21) Appl. No.: 10/041,527

(22) Filed: Oct. 24, 2001

(65) Prior Publication Data

US 2003/0077937 A1 Apr. 24, 2003

(51) Int. Cl.[7] .............................................. H01R 3/00
(52) U.S. Cl. ...................................... 439/500; 439/677
(58) Field of Search ................................ 439/500, 677, 439/504, 627, 681, 684, 696, 388, 722, 754, 202; 429/1, 9, 7

(56) References Cited

U.S. PATENT DOCUMENTS

| | | | | |
|---|---|---|---|---|
| 3,105,938 A | * | 10/1963 | Onnigian et al. | ........... 455/100 |
| 3,569,919 A | | 3/1971 | Daddona, Jr. | |
| 3,980,388 A | | 9/1976 | Nailor, III | |
| 4,084,037 A | | 4/1978 | Morton | .......................... 429/1 |
| 4,213,078 A | * | 7/1980 | Ferrell et al. | ................ 320/107 |
| 4,226,497 A | | 10/1980 | Polonsky et al. | |
| 4,595,641 A | * | 6/1986 | Giurtino | .......................... 429/1 |
| 4,737,420 A | * | 4/1988 | Ikeda et al. | ..................... 429/1 |
| 5,194,340 A | * | 3/1993 | Kosako | .......................... 429/1 |
| 5,367,575 A | * | 11/1994 | Dieken et al. | ................. 381/67 |
| 5,736,273 A | * | 4/1998 | Lee | .............................. 429/100 |

OTHER PUBLICATIONS

The American Heritage Dictionary of the English Language, Third Edition copyright 1992 by Houghton Mifflin Company. Electronic version licensed from INSO Corporation.*

* cited by examiner

*Primary Examiner*—Tho D. Ta
*Assistant Examiner*—James R. Harvey (57) ABSTRACT

An apparatus that prevents standard dry cell batteries from being installed in a battery compartment in a reverse polarity arrangement. The battery compartment operationally houses at least one dry cell battery having a cylindrical casing with positive and negative terminal surfaces on opposing ends thereof. The positive terminal surface has a button protruding from the casing. In this aspect of the invention, the battery compartment is configured with positive and negative device contacts disposed in opposing ends of each battery cradle of the battery compartment to contact positive and negative terminals, respectively, of a dry cell battery installed therein. The battery compartment also comprises a reverse polarity exclusion device disposed in each battery cradle. The device is interposed between the positive device contact and a dry cell battery installed in the battery cradle. The device permits the positive terminal button to abut the positive device contact while preventing the negative terminal of the installed battery from abutting the positive device contact.

12 Claims, 6 Drawing Sheets

FIG. 8

APPARATUS FOR PREVENTING REVERSE POLARITY CONTACT BETWEEN A STANDARD DRY CELL BATTERY TERMINAL AND A BATTERY COMPARTMENT CONTACT

BACKGROUND OF THE INVENTION

1. Field of the Invention

The present invention relates generally to batteries and, more particularly, to preventing reverse polarity contact between terminals of a standard dry cell battery and device contacts in a battery compartment in which the battery is installed.

2. Related Art

Electrical devices commonly derive their power by way of one or more batteries that are housed within a compartment associated with the device. The battery compartment typically is integral with the electrical device. Alternatively, the battery compartment can be provided remotely from the electrical device with a connection thereto via conductor elements such as electrical wires.

There are numerous types of primary (non-rechargeable) and secondary (rechargeable) dry cell batteries. Dry cell batteries are commercially available in a number of well-known sizes and configurations such as the standardized AAA, AA, C, and D battery sizes. The corresponding battery compartments have electrical contacts for contacting the terminals of the dry cell batteries installed within the compartment. These contacts are commonly referred to as either battery contacts (functional perspective) or device contacts (location perspective), latter term being used herein. When one or more dry cell batteries are installed in such battery compartments, the device serves as an electrical load placed across the terminals of the installed battery/ies, consuming battery power in the form of a current drawn from the battery/ies.

Dry cell battery compartments have at least one battery cradle with positive and negative contacts disposed on opposing ends thereof. The negative contact, commonly in the form of a planar tab or a conical coiled spring, abuts or contacts the negative terminal of the installed dry cell battery. The positive contact, commonly in the form of a planar tab, contacts the positive terminal of an installed dry cell battery. In compartments that house more than one dry cell battery, the batteries will be physically arranged either in series or parallel. In a series arrangement, the batteries are positioned in a single battery cradle with the planar surface of the positive terminal button abutting the planar negative terminal surface of a forward adjacent battery. In such embodiments, the positive terminal of the forward-most battery abuts the positive device contact while the negative terminal of the rear-most battery abuts the negative device contact. In a parallel arrangement, a pair of positive and negative device contacts is provided in each battery cradle of the compartment to electrically contact a dry cell battery installed therein.

To deliver power to the device, the dry cell batteries must be installed with a proper polarity connection to the device. That is, the negative device contact must physically contact the negative terminal of the installed battery while the positive device contact physically contacts the positive battery terminal. A well-documented problem with standard dry-cell batteries is that they can be inadvertently installed in the battery compartment with the polarity reversed; that is, with the positive battery terminal abutting the negative device contact and the negative battery terminal abutting the positive device contact. This reverse polarity arrangement results in the application of a reverse voltage to the device which can damage or degrade device components.

Traditional approaches to solving this problem primarily include the use of an electronic protection circuit that controls the power provided to the device by the installed dry cell battery/ies. There are a number of drawbacks to such conventional approaches. For example, the electronic protection components can consume considerable battery power thereby increasing the total power drawn from the installed dry cell battery/ies. Such increased power consumption can decrease the terminal voltage of the installed battery/ies to below a voltage required to operate the device. To increase the battery terminal voltage to that required by the device requires the implementation of additional or larger batteries. In addition, an increase in power consumption accelerates the rate at which rechargeable batteries are depleted. Other drawbacks include the cost, reliability, maintenance, warranty costs, etc., that are associated with the use of active, that is, power consuming, electronic components.

SUMMARY OF THE INVENTION

In one aspect of the invention, a reverse polarity exclusion device is disclosed. The device is constructed and arranged to prevent reverse polarity contact between a positive device contact disposed in a battery compartment cradle and a negative terminal of a standard dry cell battery installed in the cradle.

In another aspect of the invention, a battery compartment is disclosed. The battery compartment operationally houses at least one dry cell battery having a cylindrical casing with positive and negative terminal surfaces on opposing ends thereof. The positive terminal surface has a button protruding from the casing. In this aspect of the invention, the battery compartment is configured with positive and negative device contacts disposed in opposing ends of each battery cradle of the battery compartment to contact positive and negative terminals, respectively, of a dry cell battery installed therein. The battery compartment also comprises a reverse polarity exclusion device disposed in each battery cradle. The device is interposed between the positive device contact and a dry cell battery installed in the battery cradle. The device permits the positive terminal button to abut the positive device contact while preventing the negative terminal of the installed battery from abutting the positive device contact.

In a still further aspect of the invention, an insulating spacer for use in each battery cradle of a battery compartment is disclosed. The battery compartment is configured to operationally receive a battery that comprises first and second opposing polarity terminals disposed on opposing ends thereof, with the first terminal having a raised surface with a predetermined configuration. The insulating spacer is constructed and arranged to prevent reverse polarity contact between the second polarity terminal and a first polarity device contact disposed in each battery cradle, and to allow the raised surface of the first terminal to contact the first polarity device contact.

BRIEF DESCRIPTION OF THE DRAWINGS

The foregoing and other features and advantages of the present invention will be understood more clearly from the following detailed description and from the accompanying figures. This description is given by way of example only

DETAILED DESCRIPTION

I. Introduction

The present invention is directed to an apparatus that prevents standard dry cell batteries from being installed in a battery compartment in a reverse polarity arrangement. The present invention, referred to as a reverse polarity exclusion device, is an insulator installed in or integral with each battery cradle of a dry cell battery compartment. The exclusion device surrounds at least a portion of the positive device contact so that it is interposed between an installed standard dry cell battery and the positive device contact. The exclusion device is configured so as to not interfere with the achievement of a secure physical contact between the positive device contact and the positive battery terminal button of a properly installed dry cell battery. However, when a dry cell battery is installed in a reverse polarity arrangement, the exclusion device prevents the negative battery terminal from abutting the positive battery contact. Advantageously, the exclusion device eliminates the risk of component damage or degradation due to the application of a reverse voltage from the installed battery/ies. In addition, the exclusion device is passive; that is, it consumes no energy, thereby eliminating the drawbacks associated with traditional active electronic protection approaches. For example, the exclusion device does not alter the terminal voltage of the installed battery/ies, does not accelerate the rate at which rechargeable batteries are to be recharged, and does not have the maintenance, reliability, and other issues associated with the implementation of electronic and electrical components.

II. Battery Description

A battery, sometimes referred to as an electric cell, is a device that converts chemical energy into electricity. As used herein, a battery can include of one cell alone as well as two or more cells connected in series or parallel within a single casing. Each cell consists of a liquid, paste or solid electrolyte, a positive electrode and a negative electrode. The electrolyte serves as an ionic conductor; one of the electrodes reacts with the electrolyte to produce electrons while the other electrode accepts the electrons. When connected across a load, such as when installed in a device battery compartment, this reaction causes current to flow from the battery and power to be consumed. Although the present invention can be applied to and operate with many types of rechargeable and non-reachargeable batteries, the present invention, solely for ease of understanding, will be described in connection with standard dry cell batteries.

Figure 1A:
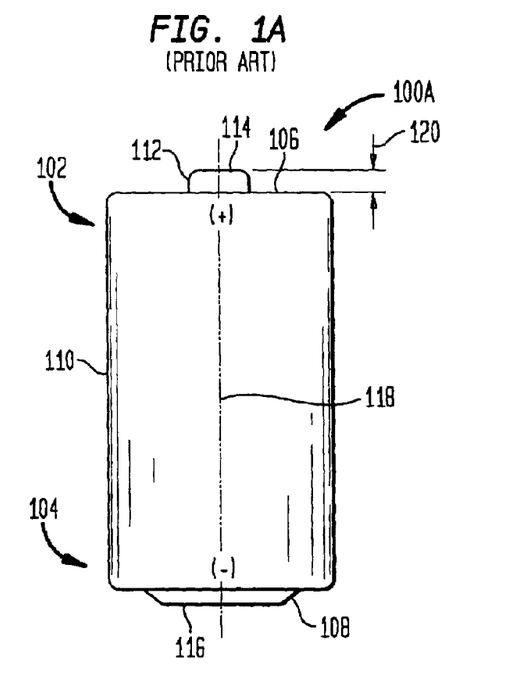
FIG. 1A is a schematic side view of a standard dry cell battery.
Figure 1B:
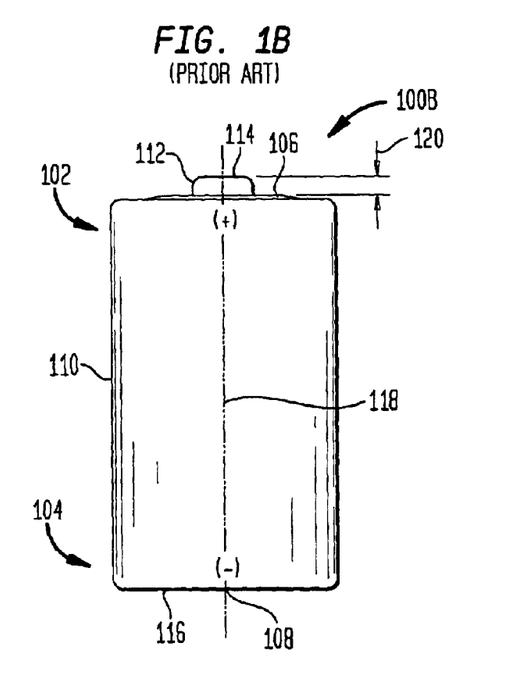
FIG. 1B is a schematic side view of a slightly different standard dry cell battery.

A perspective view of two commonly available, standard dry cell batteries is provided in FIGS. 1A and 1B. Dry cell batteries 100A and 100B are collectively and generally referred to as dry cell batteries 100 or, simply, battery or batteries 100. Dry cell batteries 100 can be either primary or secondary batteries. Primary batteries are batteries in which the electrolytes cannot be reconstituted into their original form once the energy stored in the battery has been converted into a current; that is, they are non-rechargeable. Primary battery cells were originally referred to as a Leclanché cell in honor of its inventor, French chemist Georges Leclanché who invented the dry cell battery in the 1860's. Other names given to this type of battery include, for example, a flashlight battery, a voltaic battery, an alkaline battery, etc. Dry cell batteries 100 can also be secondary batteries. Secondary batteries can be recharged by reversing the chemical reaction in the battery. Rechargeable batteries were invented in 1859 by the French physicist Gaston Planté. Such batteries have different chemistries such as Lithium Ion, Nickel Cadmium, Nickel Metal Hydride, rechargeable alkaline, and others. The internal structure and chemical composition of rechargeable and non-rechargeable dry cell batteries 100 are well known and not described further herein.

The size and configuration of primary dry cell batteries and, more recently, secondary dry cell batteries, are specified by ANSI standards, and are commercially available in the well-known and commercially-available standardized AAA, AA, C, and D battery sizes. As such, a common feature of all such dry cell batteries 100 is the physical configuration. FIGS. 1A and 1B are side views of two standard dry cell batteries 100A and 100B that satisfy the specifications for a "C" size dry cell battery. Dry cell batteries 100 includes a cylindrical shell or casing 110 defining a head region 102 and a tail region 104. A positive terminal 106 is disposed at head region 102 while a negative terminal 108 is disposed at tail region 104. The internal configuration and chemistry of dry cell batteries 100 varies, and is well known in the art. However, in all cases, a positive terminal 106 and negative terminal 108 are disposed on opposing ends of casing 110.

Positive terminal 106 includes a formed cylindrical protrusion 112 extending from casing 110, commonly referred to as a button. Terminal button 112 has a top surface 114 that is substantially planar. Similarly, negative terminal 108 has a surface 116 that is also substantially planar. A longitudinal axis 118 extends through batteries 100 from negative terminal 108 to positive terminal 106. Planar surfaces 116 and 114 are substantially orthogonal to longitudinal axis 118.

Examples of the above batteries are available from Duracell, Inc., and Eveready Battery Company, Inc. DURACELL® batteries are described in detail at www.duracell.com, while the EVEREADY® batteries are described in detail at www.eveready.com. (DURACELL is a registered trademark of Duracell Inc., a division of The Gillette Company. EVEREADY is a registered trademark of the Eveready Battery Company, Inc.) Because the dimensions of these and other dry cell batteries have been standardized and are specified by ANSI standards, the dimensions of such batteries will be substantially the same, within the specified tolerances, regardless of manufacturer. For example, height 120 of positive terminal button 112 and/or the shape of negative terminal 108 can vary slightly, as shown by the two illustrative batteries 100A and 100B.

III. Battery Compartments

Figure 2:
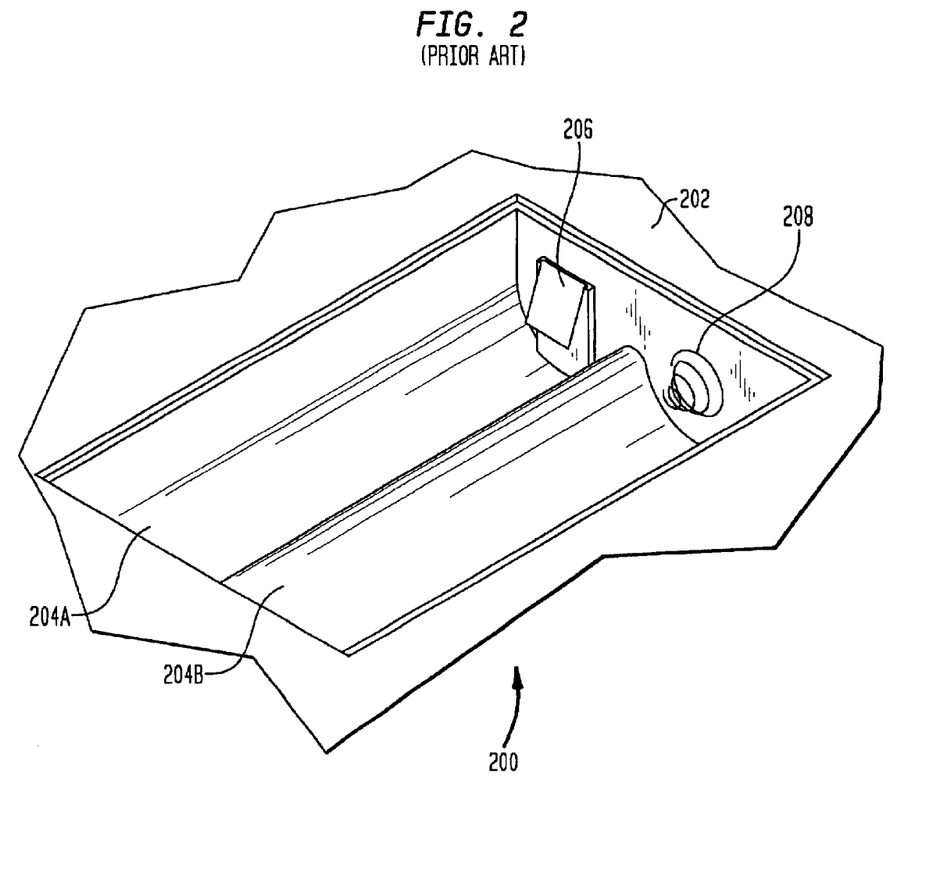
FIG. 2 is a perspective view of an exemplary battery compartment with two battery cradles each suitable for implementing embodiments of the reverse polarity exclusion device of the present invention.

Battery compartments configured to operatively receive one or more standard dry cell batteries 100 are commonly used and are well known. For example, consumer electronics, hand-held appliances and tools, battery-powered toys and the like typically have a dry cell battery compartment. FIG. 2 is a perspective view of an exemplary battery compartment 200.

As noted, battery compartments can be configured to operationally hold one or more standard dry cell batteries 100. FIG. 2 is a perspective view of an exemplary battery compartment 200 configured to hold two standard dry cell batteries 100. Battery compartment 200 includes a housing 202 having formed therein two battery cradles 204A and 204B (collectively and generally referred to as cradles 204) each configured to operatively receive a single dry cell battery 100. Battery cradles 204 are configured such that, when installed, the dry cell batteries are laterally-adjacent with each other. As noted, in the laterally-adjacent arrangement, longitudinal axes 118 of installed batteries 100 are substantially parallel, with head region 102 of one battery 100 being adjacent to either head region 102 or tail region 104 of a neighboring battery 100. That is, neighboring installed batteries either face the same or opposite directions. In the is exemplary compartment 200, when properly installed, batteries 100 face opposite directions. As noted, battery compartments can also be configured to retain more than one dry cell battery 100 in a serially-aligned arrangement. In such a compartment the installed dry cell batteries 100 are arranged in a straight line in a single battery cradle with their longitudinal axes 118 coextensive.

Disposed in opposing ends of each cradle 204 of battery compartment 200 is one of a pair of positive and negative device contacts 206 and 208. In the multiple cradle compartment 200, there are two pairs of device contacts, one for each cradle 204. Each cradle 204 receives one battery 100 that physically and electrically contacts the device contacts 206, 208. When properly installed, the laterally-adjacent dry cell batteries 100 are arranged such that head region 102 of a battery 100 installed in cradle 204A is adjacent to a tail region 104 of a battery 100 installed in cradle 204B. That is, properly installed batteries face in opposing directions, with positive terminal button 106 of a battery 100 installed in cradle 204A abutting positive device contact 206 and negative terminal 108 of a battery 100 installed in cradle 204B abutting negative device contact 208.

As noted, a dry cell battery 100 installed in conventional battery compartment 200 can be installed in a reverse polarity arrangement. That is, standard dry cell batteries 100 can be installed in battery cradle 204A with negative battery terminal 108 abutting positive battery contact 206 and positive battery terminal 106 abutting the corresponding negative battery contact that is out of view. Similarly, a dry cell battery 100 can be installed in cradle 204B with positive battery terminal 106 abutting negative contact 208 and negative battery terminal 108 abutting the corresponding positive battery contact that is out of view. A similar problem can arise in battery compartments with a single cradle that holds a plurality of batteries in a serially-aligned arrangement. Such a reverse polarity arrangement can, as noted, damage or degrade device components. Traditional electrical circuits implemented to avoid the application of a reverse voltage to the powered components are subject to the noted and other drawbacks that make them unsuitable in impracticable for many applications.

IV. Reverse Polarity Exclusion Device

In contrast to the noted conventional approaches, the reverse polarity exclusion device of the present invention is a passive apparatus adapted to be interposed between a device contact and a terminal of a dry cell battery installed therein. The exclusion device prevents improperly installed dry cell batteries from electrically contacting the device contacts, thereby preventing application of a reverse voltage to the device.

Specifically, the inventor has observed that a standard dry cell battery 100 has terminals with significantly different configurations. Negative terminal 108 is flush or substantially flush with cylindrical casing 110 and has a planar surface 116 with a surface area substantially the same as the cross-sectional area of casing 110. In contrast, positive terminal 106 includes a formed cylindrical protrusion ("button") 112 that extends from casing 110 by a height 120. Positive terminal button 112 has a cross-sectional area that is substantially less than that of casing 110, and the area of surface 114 is substantially less than the area of negative terminal surface 116. The present invention is configured to prevent positive device contact 206 from contacting the relatively larger negative terminal 106 while allowing it to contact positive terminal button 112. When operationally implemented with positive device contact 206, the exclusion device prevents batteries installed in a reverse polarity arrangement from applying a reverse voltage to the device. As one or ordinary skill in the art should find apparent, the exclusion device of the present invention can take on many different configurations that permit a raised surface of one battery terminal from abutting a contact while preventing an opposing polarity terminal that lacks such a raised surface from doing the same. Exemplary embodiments of the exclusion device, implemented as a separate unitary element or as an element of a larger, integral member, are described below in connection with battery compartment 200.

Figure 3:
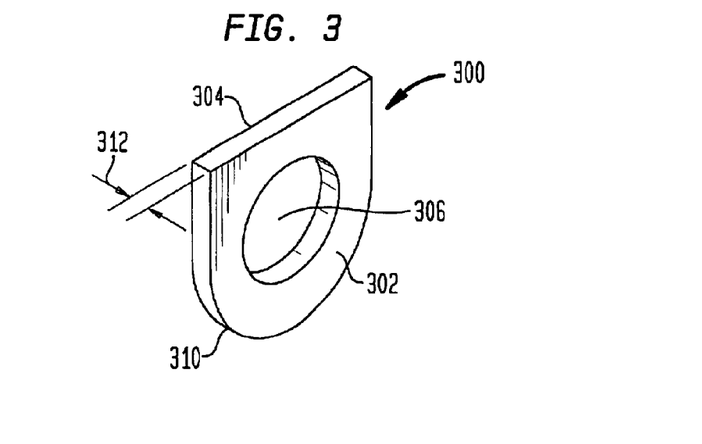
FIG. 3 is a perspective view of the reverse polarity exclusion device configured to operate with a single dry cell battery cradle in accordance with one embodiment of the present invention.

FIG. 3 is a perspective view of one embodiment of the reverse polarity exclusion device of the present invention. Exclusion device 300 is an insulating spacer to be installed in one battery cradle 204 of dry cell battery compartment 200. Device 300 is adapted for placement in a battery cradle 204 against the positive device contact 206 disposed in that cradle. As shown in FIG. 2, each illustrative battery cradle 204 has a concave surface to hold an installed battery 100. Device 300 has a lower edge 310 that is curved to conform with the curved portion of housing 202 that forms battery cradle 204. Device 300 is dimensioned such that, when positioned within battery cradle 204 against positive device contact 206, it does not interfere with the normal use of battery compartment 200. For example, device 300 has a top edge 304 that does not extend beyond the opening of battery compartment 200 which would interfere with the closing of a battery compartment door (not shown).

In this exemplary embodiment, device 300 is a contiguous, unitary element configured to be interposed between an installed standard dry cell battery 100 and positive device contact 206. Exclusion device 300 includes a peripheral region 302 defining an aperture 306. Peripheral region 302 has opposing surfaces that are juxtaposed with an installed dry cell battery 100 and positive device contact 206. When installed in a battery cradle 204 adjacent to a positive terminal 206, exclusion device 300 exposes a portion of positive device contact 206. Aperture 306 is aligned with button 112 of an installed battery 100, and has a dimensions sufficiently large to receive button 112 and sufficiently small to prevent entry of negative terminal 108 of an installed battery 100. Exclusion device 300 has a thickness 312 that defines the depth of aperture 306. The dimensions of device 300 are selected such that device 300 does not interfere with the abutment of positive device contact 206 and positive battery terminal button 112 of a properly installed dry cell battery 100. However, when a dry cell battery 100 is installed in a reverse polarity arrangement, exclusion device 300 prevents negative battery terminal 108 from abutting positive battery contact 206.

Figure 4A:
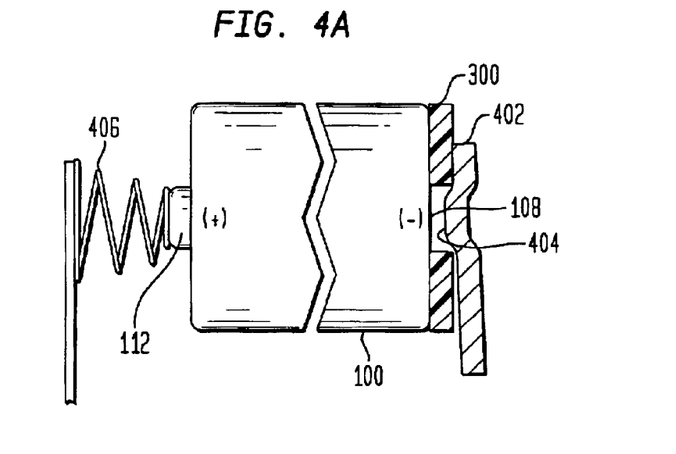
FIG. 4A is a side cross-sectional view of one embodiment of the present invention illustrating the manner in which it does not interfere with the physical contact between a terminal of a properly installed dry cell battery and a device contact disposed in the battery compartment.
Figure 4B:
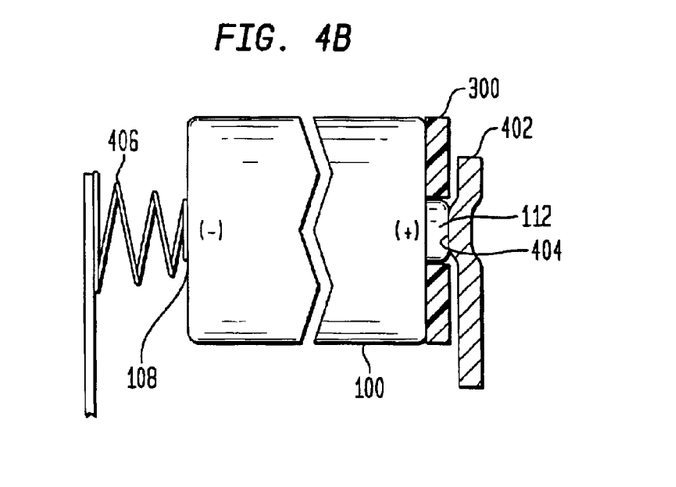
FIG. 4B is a side cross-sectional view of the embodiment of the present invention illustrated in FIG. 4A illustrating the manner in which the exclusion device prevents physical contact between a terminal of an a improperly installed dry cell battery and device contact disposed in the battery compartment.

FIGS. 4A and 4B are partial cross-sectional side views of reverse polarity exclusion device 300 installed in a battery cradle (not shown) against a positive battery contact 402. In FIGS. 4A and 4B, positive battery contact 402 is in the form of a leaf spring with a raised surface 404 for abutting positive terminal button 112 of a properly installed dry cell battery 100. Also, in this exemplary application, a negative battery contact 406 is in the form of a coiled spring to provide an axial force against the installed battery 100 to insure the battery is securely maintained in cradle 204 between contacts 404 and 406.

In FIG. 4A, dry cell battery 100 is installed improperly; that is, with the polarity reversed. There, negative terminal 108 is adjacent to positive contact 402 and positive terminal button 112 abuts coiled spring contact 460. However, negative terminal 108 is prevented from abutting positive battery contact 402 due to the presence of device 300 interposed between battery 100 and device contact 402. In contrast, FIG. 4B illustrates the same dry cell battery 100 installed properly; that is, with the proper polarity. Positive terminal button 112 extends through aperture 306 to abut raised surface 404 of positive battery contact 402. Negative terminal 108 abuts negative coiled spring contact 406. Thus, exclusion device 300 prevents the application of a reverse voltage by battery 100 when installed as shown in FIG. 4A while not interfering with the proper installation of battery 100, as shown in FIG. 4B.

It should be appreciated from the foregoing that the size, shape and location of aperture 306 in device 300 is configured such that, when placed against positive battery contact 206, aperture 306 is aligned with and exposes at least a portion of positive device contact 206. In the embodiment illustrated in FIGS. 4A and 4B, aperture 306 is aligned with raised surface 404 of positive device contact 402. It should also be appreciated that the dimensions of device 300 are selected to accommodate the size and shape of positive battery terminal button 112, positive battery contact 206, 402, etc.

For example, exclusion device 300 has a thickness 312 sufficient to enable positive terminal button 112 to abut positive device contact 206. In applications in which the positive device contact is substantially planar, embodiments of device 300 have a thickness that is less than height 120 of positive terminal button 112. Such a thickness allows surface 114 of terminal button 112 to extend beyond surface 304 of device 300. In applications in which positive device contact 206 has a raised surface such as surface 404 that enters aperture 306, then embodiments of device 300 implemented in such applications have a thickness that is less than the sum of the height of the raised positive terminal surface 404 and height 120 of positive terminal button 112.

Figure 5:
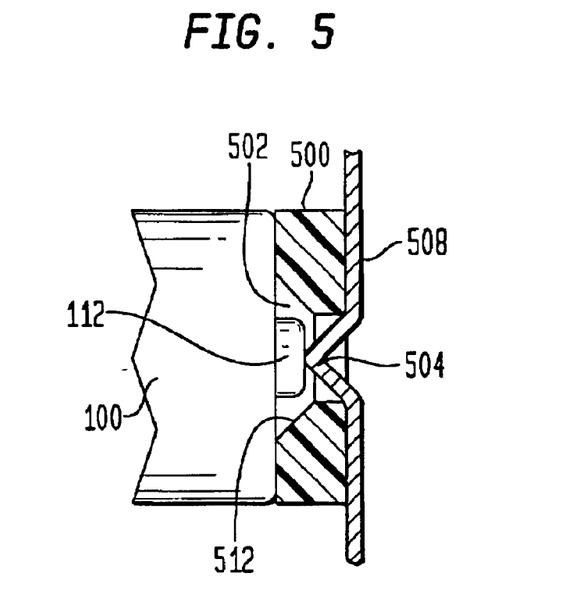
FIG. 5 is a side cross-sectional view of the reverse polarity exclusion device in accordance with an alternative embodiment of the present invention.
Figure 6:
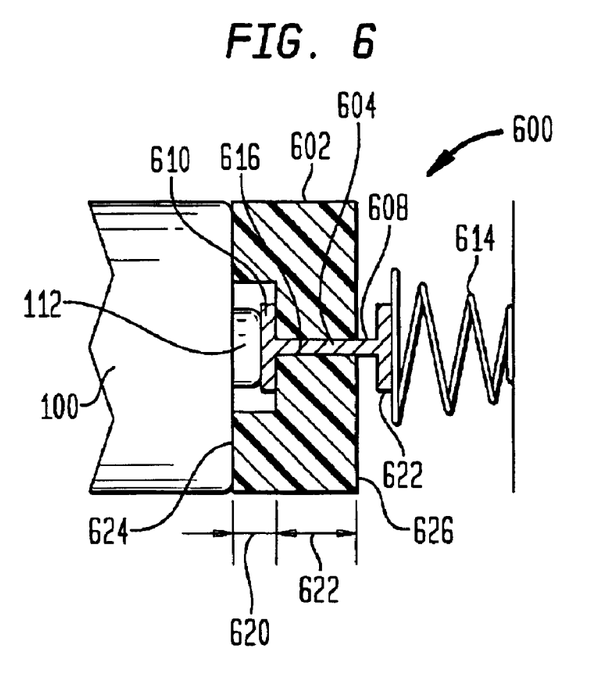
FIG. 6 is a side cross-sectional view of the reverse polarity exclusion device in accordance with a further embodiment of the present invention.

FIGS. 5 and 6 are cross-sectional side views of alternative embodiments of the reverse polarity exclusion device of the present invention. Referring to FIG. 5, a positive device contact 508 has a raised surface 504 that extends into aperture 502 of a reverse polarity exclusion device 500. When installed, positive terminal button 112 of battery 100 extends partially into aperture 502 to abut raised surface 504 of positive device contact 508. In this illustrative embodiment, aperture 502 is dimensioned with a beveled edge 512 that abuts installed dry cell battery 100. Such a beveled edge 512 facilitates the alignment of positive terminal button 112 and aperture 502.

FIG. 6 is a side cross-sectional view of an alternative embodiment of a reverse polarity exclusion device 600 integrated with a positive device contact. In this embodiment, a positive device contact 608 includes two substantially parallel rectangular regions 610 and 612 spaced apart and coupled by a shaft region 604 perpendicular to regions 610, 612, forming an "I" cross-section as shown in FIG. 6. Exclusion device 602 includes an aperture that includes two regions 606, 610 with different diameters to accommodate different regions of device contact 608. A first region 606 extends into device 602 for a depth 620 from a surface 624 that faces and abuts installed battery 100. First region 606 is dimensioned to receive rectangular region 610. Contiguous with first region 606 is a second region 616 that extends for a depth 622 from a surface 626 that faces away from installed battery 100. Together, regions 606 and 608 define the aperture through the device while distances 620 and 622 define the thickness of device 602.

Device contact portion 610 provides a surface for contacting a positive terminal button 112 while the portion 612 of device contact 608 provides a surface for contacting a coiled spring contact 614. Coiled spring contact 614 provides a spring force against device portion 612, causing positive terminal 608 to travel in the aperture until device portion 612 rests against surface 626 of exclusion device 602. When a dry cell battery 100 is properly installed in the battery compartment, positive terminal button 112 is positioned in aperture region 606 to abut positive device portion 610. When the axial force applied to rectangular portion 610 by positive terminal button 112 is greater than the spring force applied by coiled spring 614, positive device contact 604 travels toward spring 614 until rectangular region 610 rests against exclusion device 602. It should be understood that the dimensions of the device contact such as the length of contact shaft 616, thickness of portions 610 and 612, as well as the distances 620 and 622 are selected to determine a desired range of travel of positive terminal 604 in exclusion device 602. For example, in the illustrative embodiment, the dimensions of the components are selected to limit the length of travel of device contact 608 to maintain device contact portion 610 within region 606.

Figure 7A:
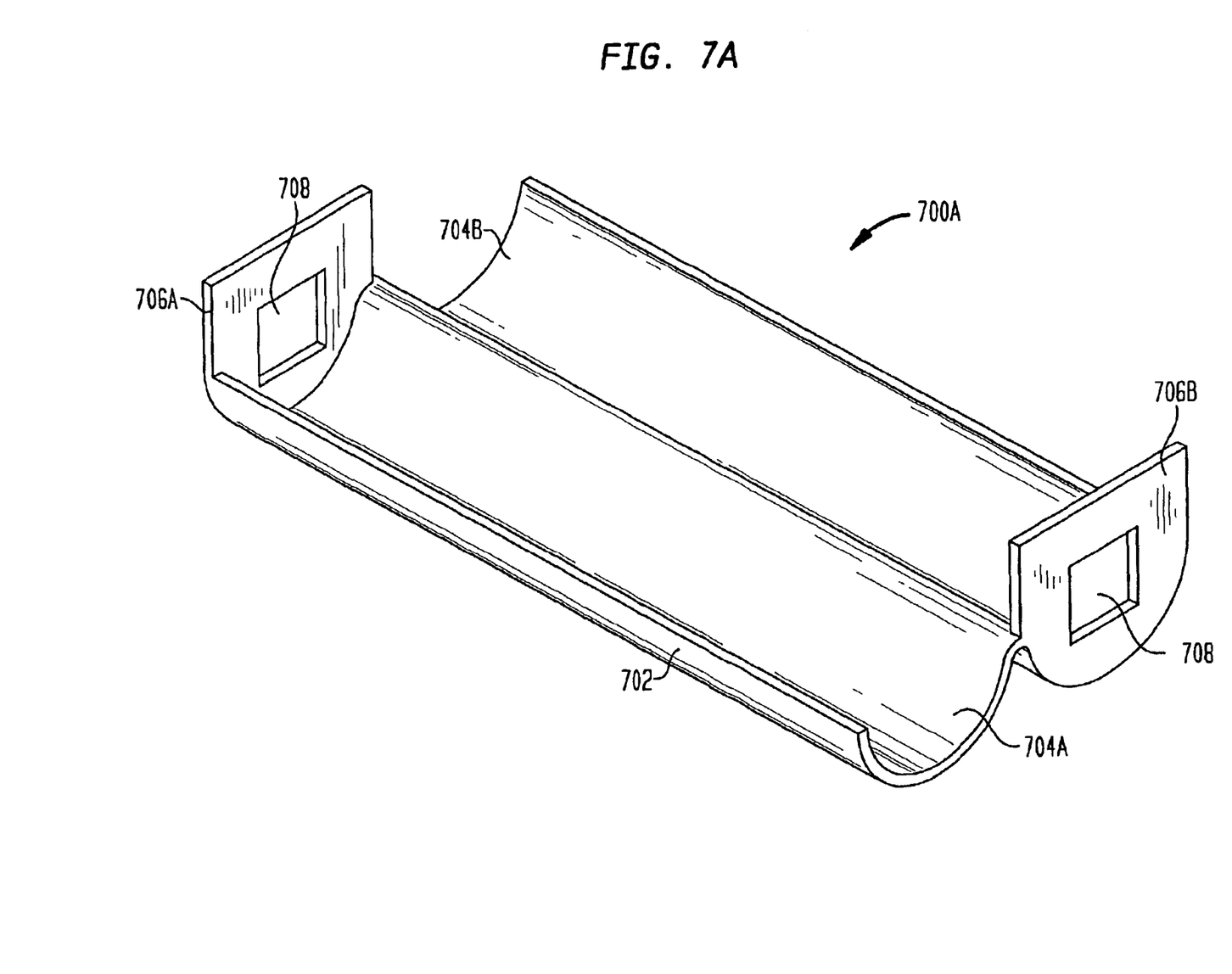
FIG. 7A is a perspective view of a battery compartment insert including a plurality of reverse polarity exclusion devices in accordance with one embodiment of the present invention.
Figure 7B:
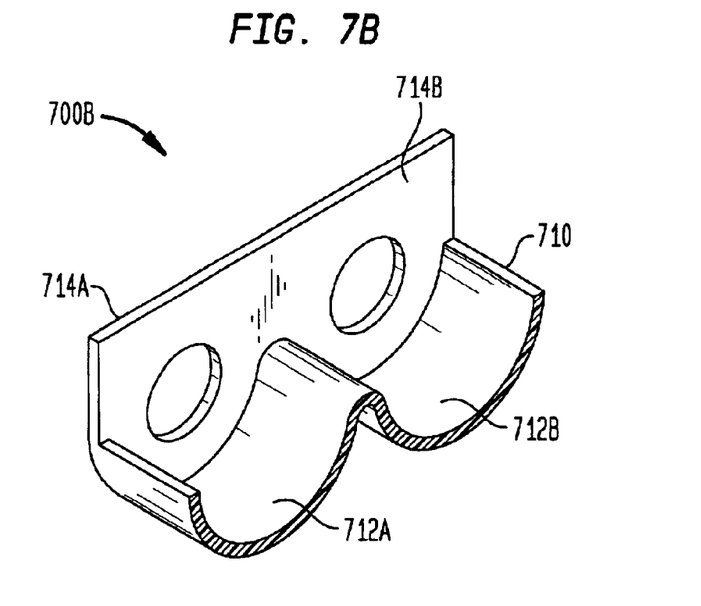
FIG. 7B is a perspective view of a battery compartment insert including a plurality of reverse polarity exclusion devices in accordance with another embodiment of the present invention.

FIGS. 7A and 7B are perspective views of an alternative implementation of the present invention. These figures depict what is referred to herein as battery compartment inserts 700A and 700B. Battery compartment inserts 700 are preferably unitary, molded elements formed to fit unobtrusively into a battery compartment such as battery compartment 200. In accordance with the teachings of the present invention, such battery compartment inserts 700 include one or more integrated reverse polarity exclusion devices.

For ease of illustration, battery compartment inserts 700 are configured to inter-operate with battery compartment 200. As noted, battery compartment 200 includes two battery cradles 204 each of which houses a standard dry cell battery 100. As noted, the installed batteries 100 are maintained in a laterally-adjacent arrangement with head region 102 of one properly installed battery 100 adjacent to the tail region 104 of the neighboring properly installed battery 100. As noted, for each battery position 204, battery compartment 200 includes a pair of positive and negative battery contacts 206 and 208, respectively.

Referring first to FIG. 7A, battery compartment insert 700A includes a base 702 that includes two concave insert cradles 704A and 704B for fitting into and conforming with battery cradles 204A and 204B, respectively. Formed in insert 700A is a reverse polarity exclusion device 706A at one end of insert cradle 704A, and another reverse polarity exclusion device 706B at the opposing end of insert cradle 704B. When inserted into battery compartment 200, reverse polarity exclusion devices 706A and 706B are positioned immediately adjacent to positive battery contacts 206, as described above. In the exemplary embodiment shown in FIG. 7A, reverse polarity exclusion devices 706A and 706B each have an aperture 708 with a rectangular cross-section. Exclusion devices 706 are configured such that, when installed in compartment 200, apertures 708 are aligned with at least a portion of positive device contact 206 to expose the surrounded portion to a dry cell battery 100 installed in the insert cradle 704.

Battery compartment insert 700B is configured to inter-operate with a battery compartment in which two standard dry cell batteries are housed in a laterally-adjacent arrangement facing in the same direction; that is, with the head regions 102 adjacent to each other. In such a compartment, the positive contacts are also adjacent to each other; that is, the positive battery contacts 206 are located at the same end of each battery cradle.

To achieve the reverse polarity protection provided by the present invention, battery compartment insert 700B has a base 710 that includes two partial insert cradles 712A and 712B each of which conforms with the shape of a portion of a corresponding battery cradle 204 proximate to positive device contact 206. Associated with each insert cradle 712 is a reverse polarity exclusion device 714A and 714B. In contrast to device 700A, in insert 700B, exclusion devices 714 are located adjacent to each other since they are to be aligned with the positive device contacts that are located on the same side of the battery compartment. As shown in FIG. 7B, insert 700B has a base 710 that does not have a length sufficient to cover completely the corresponding battery cradle. Such an embodiment can be implemented to reduce the size and cost of insert 700B as compared to insert 700A.

V. Exemplary Device Application

Figure 8:
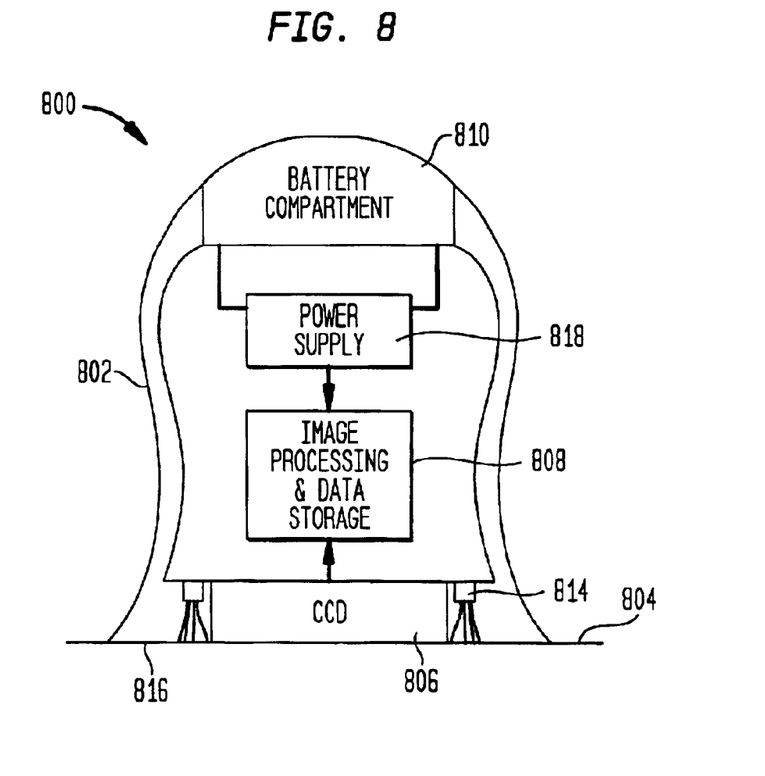
FIG. 8 is a schematic block diagram of a hand-held scanner having a battery compartment suitable for implementing embodiments of the present invention.

The battery compartment of the present invention can be implemented in any battery-powered device now or later developed. Any battery-powered device can benefit from the present invention. As noted, those devices that are most adversely effected by the noted contact resistance are high current devices. Examples include devices that have light attachments such as cameras, scanners, flash lights and VCRs; power tools such as power screw drivers, power drills, hedge trimmers, electric razors, and the like; and other types of battery-powered devices. It should be understood that this is not by limitation and that the present invention can be implemented on numerous other battery-powered devices. One such device, a scanner, is described below with reference to FIG. 8. FIG. 8 is a schematic block diagram a hand-held scanner implementing the battery compartment of the present invention. Scanner 800 is any scanner such as the hand-held optical scanners available from Hewlett-Packard Company.

Scanner 800 has a bell-shaped housing 802 with a flat bottom surface 816. Housing 802 is designed to be easily grasped by a user. Generally, the user will hold housing 102 and manually drag scanner 800 over a paper 804 to scan to printed information presented thereon. Scanner 800 includes a CCD 806 with navigational illumination lights 814. Navigation illumination devices 814 are high power drainage devices that generate infrared light that is used by an image processing and data storage device 808 to track the location of scanner 800 on paper 804. CCD 806 picks up the information on the page 804 and image processor 808 reconstructs the image on the paper. A battery compartment 810 is configured to receive two 1.2 volt, AA dry cell batteries. Power supply 818 coverts the 2.4 DC voltage to a 5 and 12 volts DC for use by scanner 800.

VI. Closing

While various embodiments of the present invention have been described above, it should be understood that they have been presented by way of example only, and not limitation. For example, it should be appreciated that although the above exemplary embodiments have been presented in the application of a standard dry cell battery, the teachings of the present invention can be applied to other types of batteries. It should also be apparent that the present invention can be applied to circumstances in which the negative device contact rather than the positive device contact is the protected contact. Those of ordinary skill in the art would appreciate that any insulating material or composite can be used to form the exclusion device of the present invention. With regard to battery compartment inserts, it should be understood that they can be of any size and configuration appropriate to unobtrusively fit into the battery compartment. It should also be apparent that the exclusion device and base elements of the inserts can be unitary as described above, or may be manufactured separately and attached in some well-known manner to form an integral insert. Alternative embodiments included within the scope of the invention also include battery compartments with an exclusion device secured permanently therein. Alternatively, the reverse polarity exclusion device could be formed within the housing of the battery compartment to provide the requisite protection in each of the battery cradles of the compartment. Further variations of the reverse polarity exclusion device include the permanent inclusion of the device in a battery compartment. Thus, the breadth and scope of the present invention should not be limited by any of the above-described exemplary embodiments, but should be defined only in accordance with the following claims and their equivalents.

What is claimed is:

1. An insert to be removably installed in a battery compartment cradle with positive and negative device contacts disposed at opposing ends of the compartment cradle to contact a raised positive terminal button and a planar negative terminal surface of an installed standard dry cell battery, comprising:

a base comprising an insert cradle configured to fit into and conform with the compartment cradle and adapted to receive the installed dry cell battery; and an insulated spacer, attached directly to an end of the base to form a single, integrated insert, wherein the spacer is substantially perpendicular with the base and has an aperture configured to receive the raised positive terminal button, whereby when the insert is positioned in the compartment so that the spacer of the insert is adjacent to the positive device contact, the insert cradle covers the compartment cradle and the spacer prevents reverse polarity contact between the positive device contact and the negative terminal of the battery while enabling the positive terminal button to pass through the aperture to abut the positive device contact.

2. The insert of claim 1, wherein the spacer has a perimeter defining a cross-sectional area that is at least a substantial portion of a surface area of the positive device contact.

3. The insert of claim 1, wherein the positive device contact has a substantially planar surface for abutting the positive terminal button, and wherein the spacer has a thickness that is less than or equal to a height of the raised positive terminal button.

4. The insert of claim 1, wherein the positive device contact has a raised surface that extends into the aperture for a first distance less than a thickness of the spacer, and wherein the thickness of the spacer is less than or equal to a sum of the first distance and the height of the raised positive terminal button.

5. The insert of claim 1, wherein the spacer and base are unitary.

6. An insert to be removably installed in a battery compartment having a plurality of a battery cradles and positive and negative device contacts disposed at opposing ends of each compartment cradle to contact a raised positive terminal button and a planar negative terminal surface of an installed standard dry cell battery, comprising:

a base comprising a plurality of insert cradles each configured to fit into and conform with a corresponding compartment cradle and adapted to receive the installed dry cell battery; and a plurality of insulated spacers, each attached directly to an end of the base to form a single, integrated insert, wherein the spacer is substantially perpendicular with the base and has an aperture with a diameter greater than a diameter of the raised positive terminal button, whereby when the insert is positioned in the compartment so that the spacers of the inserts are adjacent to a positive device contacts, each of the plurality of insert cradles are unobtrusively proximate to a corresponding compartment cradle and the spacers each prevent reverse polarity contact between the positive device contact and the negative terminal of the battery while enabling the positive terminal button to contact the positive device contact through the aperture.

7. The insert of claim 6, wherein the compartment is configured with the plurality of battery cradles in a laterally-adjacent arrangement.

8. The insert of claim 6, wherein the positive device contacts are disposed at the same end of each compartment cradle, and wherein the plurality of insulated spacers are attached to the base at the same end of each corresponding insert cradle.

9. The insert of claim 6, wherein at least one of the spacers has a perimeter defining a cross-sectional area that is at least a substantial portion of a surface area of the positive device contact disposed in the corresponding compartment cradle.

10. The insert of claim 6, wherein the positive device contact disposed in each compartment cradle has a substantially planar surface for abutting a positive terminal button, and wherein each spacer has a thickness that is less than or equal to a height of the positive terminal button.

11. The insert of claim 6, wherein at least one of the positive device contacts has a raised surface that extends into the aperture for a first distance less than a thickness of the spacer of the corresponding insert cradle, and wherein the thickness of that spacer is less than or equal to a sum of the first distance and the height of the positive terminal button.

12. The insert of claim 6, wherein the plurality of spaces and base are unitary.

* * * * *